United States Patent
Yamada

(10) Patent No.: US 8,400,654 B2
(45) Date of Patent: Mar. 19, 2013

(54) PRINT CONTROL APPARATUS, METHOD AND RECORDING MEDIUM USING SELECTIVE CONVERSION OF PRINTER SETTING DATA INTO PJL OR PDL

(75) Inventor: Satoshi Yamada, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1224 days.

(21) Appl. No.: 12/001,508

(22) Filed: Dec. 12, 2007

(65) Prior Publication Data

US 2008/0137139 A1    Jun. 12, 2008

(30) Foreign Application Priority Data

Dec. 12, 2006  (JP) ................................ 2006-334149

(51) Int. Cl.
*G06F 3/12*    (2006.01)
(52) U.S. Cl. ....... 358/1.15; 358/442; 358/1.13; 382/276
(58) Field of Classification Search ................ 358/1.15, 358/442, 1.13; 382/276
See application file for complete search history.

(56) References Cited

U.S. PATENT DOCUMENTS

| | | | |
|---|---|---|---|
| 6,476,938 B1 * | 11/2002 | Soga | 358/442 |
| 2005/0225789 A1 * | 10/2005 | Ferlitsch | 358/1.13 |

FOREIGN PATENT DOCUMENTS

| | | |
|---|---|---|
| JP | 07-064744 | 3/1995 |
| JP | 10-124272 | 5/1998 |
| JP | 11-184654 | 7/1999 |
| JP | 2001-109598 | 4/2001 |
| JP | 2003-091401 | 3/2003 |
| JP | 2004-188619 | 7/2004 |
| JP | 2006-172352 | 6/2006 |
| JP | 2006-330828 | 12/2006 |
| JP | 2006-338237 | 12/2006 |
| JP | 2007-025748 | 2/2007 |
| JP | 2007-072743 | 3/2007 |

* cited by examiner

*Primary Examiner* — Benny Q Tieu
*Assistant Examiner* — Paul F Payer
(74) *Attorney, Agent, or Firm* — Nutter McClennen & Fish LLP; John J. Penny, Jr.; Christina M. Sperry

(57) ABSTRACT

Print control apparatuses, print control methods, and recording mediums are provided. In one embodiment, a print control apparatus includes an input unit that acquires print job definition data by acquiring print data including print job definition data and content data and interpreting the acquired print data, a plurality of converters that convert the acquired print job definition data into printer setting data, a distributor that divides the print job definition data by each item and distributes the divided items to the converters at a time when the print job definition data is supplied from the input unit to the converters and receives the printer setting data that has been converted by the converters, and a transmission unit that receives the converted printer setting data and the content data input from the input unit through the distributor and transmits the printer setting data and the content data to the printer.

11 Claims, 8 Drawing Sheets

| | PRINT SETTING MEANS |
|---|---|
| DOUBLE SIDED PRINTING | SETTING BY PJL |
| SHORT SIDE BINDING | SETTING BY PJL |
| LONG SIDE BINDING | SETTING BY PJL |
| PAPER SIZE | SETTING BY PDL |
| IMPOSITION | SETTING BY PDL |

| | PRINT SETTING MEANS |
|---|---|
| DOUBLE SIDED PRINTING | SETTING BY PJL |
| SHORT SIDE BINDING | SETTING BY PJL |
| LONG SIDE BINDING | SETTING BY PJL |
| PAPER SIZE | SETTING BY PDL |
| IMPOSITION | SETTING BY PDL |

FIG. 7

|  | CONVERTOR (I) PROCESSING UNIT | CONVERTOR (II) PROCESSING UNIT | ... |
|---|---|---|---|
| DOUBLE SIDED PRINTING SETTING | 1 | 10 | |
| SHORT SIDE BINDING | 1 | 10 | |
| LONG SIDE BINDING | 1 | 10 | |
| PAPER SIZE SETTING | 1 | 10 | |
| IMPOSITION | -1 | 20 | |

FIG. 8

PLEASE SELECT

CONVERSION PROCESSING TIME          PRINTER PROCESSING TIME

TOTAL PROCESSING TIME          REQUIRED MEMORY

FIG. 9

| | Conversion Processing Time | | | Process Time on Printer Side | | | Required Memory on Printer Side | | |
|---|---|---|---|---|---|---|---|---|---|
| | Device Setting (I) | Device Setting (II) | Device Setting (III) | Device Setting (I) | Device Setting (II) | Device Setting (III) | Device Setting (I) | Device Setting (II) | Device Setting (III) |
| Double Sided Printing Setting | 1 | 2 | 2 | 3 | 5 | 4 | 1 | 9 | 6 |
| Short Side Binding | 1 | 2 | 2 | 3 | 4 | 4 | 1 | 5 | 8 |
| Long Side Binding | 1 | 2 | 2 | 3 | 4 | 4 | 1 | 5 | 8 |
| Paper Size Setting | 1 | 2 | 2 | 3 | 4 | 4 | 1 | 5 | 6 |
| Imposition | −1 | 14 | 12 | −1 | 11 | 12 | −1 | 15 | 20 |
| Margin Setting | −1 | 3 | 4 | −1 | 8 | 10 | −1 | 9 | 2 |

FIG. 10

| | Device Setting (II) | Device Setting (III) |
|---|---|---|
| Device Setting (I) | ○ | ○ |
| Device Setting (II) | | × |

PRINT CONTROL APPARATUS, METHOD AND RECORDING MEDIUM USING SELECTIVE CONVERSION OF PRINTER SETTING DATA INTO PJL OR PDL

The entire disclosure of Japanese Patent Application No. 2006-334149, filed Dec. 12, 2006 is expressly incorporated by reference herein.

BACKGROUND

1. Technical Field

The present invention relates to a print control apparatus, a print control method, a print control program, a printer, a print method, a print program, and a recording medium which are capable of performing an appropriate print setting operation by setting a combination of a plurality of printer setting means.

2. Related Art

Generally, a print control method in which information on a print job is treated as print job definition data such as DPA (Document Printing Application), JDF (Job Definition Format), or the like for printing print data described in a page description language (PDL) such as PostScript (a trademark of Adobe Systems incorporated, U.S.A) is known.

The print job definition data includes print job specification data and print job setting data. The print job specification data, also referred to as print specification information, is information including a specification of a printed material required as a final output of a print process. Accordingly, the print job definition data is required to be converted into printer setting data that is setting data for a printer. In such a case, the operation for setting the printer can be performed by using means such as a control code (PJL (Printer Job Language) or the like), a page description language (PDL) (representatively, Post Script or the like), or the like.

As an invention having such conversion means for converting the print job definition data into the printer setting data, an invention in which the internal status of PDL processing means of a print control apparatus can be set on the basis of data represented in a format other than the PDL format that can be processed by the PDL processing means of the print control apparatus is described in JP-A-10-124272. As shown in FIG. 11, a client device 20 transmits a job 200, which is formed by adding DPA data 204 representing a new print setting to the conventional PDL data 202, to a print server 10. A controller 106 of the print server 10 extracts the DPA data 202 from the job 200 and inputs the DPA data 202 to a DPA conversion unit 108. The DPA conversion unit 108 converts the DPA data 202 into PDL data 202a and inputs the PDL data to a PDL interpreter 110. The PDL interpreter 110 sets the internal status thereof by interpreting the data 202a. When the PDL interpreter 110 completes interpretation of the data 202a, the controller 106 inputs the PDL data 204 to the PDL interpreter 110. Consequently, the PDL data 204 is processed on the basis of the settings of the DPA data 202.

In addition, as an apparatus for receiving the PJL and the PDL, there is an image forming apparatus disclosed in JP-A-2004-188619. This apparatus provides an image forming apparatus that can be easily used by enabling a user to set a preferential means from among a panel for setting various functions, a super option, the PJL, and the PDL. The image forming apparatus includes a panel setting unit for setting various functions including a double sided printing setting, a discharge destination setting, and a sort setting, a super option processing unit, and a PJL processing unit and has a mode in which settings of various functions set by a panel setting control unit 25 is treated to be preferential.

However, when the print job definition data is to be converted into the printer setting data in a case where there is a plurality of printer setting means, the above-described apparatus described in JP-A-10-124272 or JP-A-2004-188619 cannot perform the conversion process. Thus, an operation for setting the printer is required to be performed by using means such as the control code PJL or the page description language PDL together.

In other words, according to the invention described in JP-A-10-124272, general print job definition data (the technology described in JP-A-10-124272 is DPA) cannot be directly interpreted by the printer (the PDL processing means), and there is a problem that the print setting operation cannot be performed in some cases without means for converting the description of the print job definition data into a format that can be interpreted by the printer.

In addition, the invention described in JP-A-2004-188619, is an image forming apparatus that can be set by using a panel, a super option such as a command line option, the PJL, or the PDL. The image forming apparatus can precede a panel setting over other settings when settings are overlapped or the like. However, the image forming apparatus does not combine other printer setting means. In other words, according to the invention described in JP-A-2004-188619, although a print control code such as the PJL along with the PDL can be used as printer setting means, however, only preferential means from between the PJL and the PDL used as means can be set, and using the PJL and the PDL together is not considered. Accordingly, the image forming apparatus is useless in terms of the processing cost, the processing capacity, and the like, and there is a problem that an appropriate process cannot be performed.

When the PJL and the PDL are compared to each other, the PJL has a light processing load on the printer side. On the other hand, while the PDL has a heavy load on the printer side and requires consumption of large memory, the PDL can implement various print settings. Thus, in order to optimize (decrease) the process load, researches on a method in which a control code is used for a case where a setting can be made by the control code and the PDL is used for a case where a high-level setting is required are requested.

SUMMARY

An advantage of some aspects of the invention is that it provides that a print control apparatus, a print control method, a print control program, a printer, a print method, a print program, and a recording medium which are capable of performing an appropriate conversion process by having a plurality of conversion means corresponding to a plurality of printer setting means and setting the printer for each item of the print job definition data by combining the plurality of conversion means.

According to a first aspect of the present invention, there is provided a print control apparatus including an input unit that acquires print job definition data by acquiring print data including print job definition data and content data and interpreting the acquired print data, a plurality of printer setting converters that convert the print job definition data acquired by the input unit into printer setting data for setting a printer, a printer setting distributor that divides the print job definition data by each item and distributes the divided items to the plurality of printer setting converters at a time when the print job definition data is supplied from the input unit to the printer setting converters and receives the printer setting data that has been converted by the plurality of printer setting converters, and a transmission unit that receives the converted printer setting data and the content data input from the input unit through the printer setting distributor and transmits the printer setting data and the content data to the printer.

Under this configuration, since the printer setting distributor divides the print job definition data by each item and distributes the divided items to the plurality of printer setting converters, the plurality of printer setting converters can convert items of the print job definition data, for example, settings of double sided printing, short edge binding, long edge binding, a paper size, and imposition, into descriptions that can be interpreted by the printer, and thereby there is an advantage that an appropriate conversion process can be performed.

Generally, the print job definition data is information on a print job such as print job specification data and print job setting data.

The print job specification data is called print specification information and is information including the specification of a printed material required as a final output generated by a printing process. In particular, the print job specification data includes information on the size of finishing paper, the type of printing medium, a folding method, a cutting method, a binding position, a binding method, a double sided printing method, document data and a page number to be printed, and used ink. The print specification information describes only the specification of the final output and does not describe the print setting information. In other words, by only using the print specification information, the printer cannot be automatically operated, and thus, a process of converting the print specification information into print setting information satisfying the specification in any form is needed.

The print job setting data is called print setting information and is detailed setting information of the printer for a printing process. In particular, the print setting information, for example, includes information on the size of paper for imposition (printing by allocating a plurality of pages on one side of paper so as to be the size of finishing paper through folding and cutting processes), an imposition method, detailed coordinate information for imposition, a folding method, and a cutting position. In setting information included in the print setting information, there is information overlapping the print specification information.

The content data is document data linked with the print specification information and is electronic document data to be printed on the basis of the print specification. As a link method, a document may be directly included in the print specification information or the location of document data such as a URL (Uniform Resource Locator) or a file path may be included in the print specification information. In addition, the print specification information may be linked with a plurality of documents. Furthermore, not only the whole pages of the document data, but only a specific page may be linked with the print specification information.

According to a second aspect of the invention, there is provided the print control apparatus according to the first aspect, further including a processing cost information storage unit that stores processing cost information of the plurality of printer setting converters for each item of the print job definition data, wherein the printer setting distributor distributes items of the print job definition data to the plurality of printer setting converters with reference to the processing cost information.

Under this configuration, since the printer setting distributor distributes each item of the print job definition data to a printer setting converter having the lowest processing cost with reference to the processing cost information, there is an advantage that an appropriate conversion process in terms of the processing cost can be performed.

According to a third aspect of the invention, there is provided the print control apparatus according to the second aspect, wherein one of a time required for processing the printer setting data by using the printer, a time required for a conversion process, a total processing time, a memory amount required for the process, and consumption power for the process is stored as the processing cost information.

Under this configuration, since the printer setting distributor distributes each item of the print job definition data to a printer setting converter having the lowest processing cost with reference to one of a time required for processing the printer setting data by using the printer, a time required for a conversion process, a total processing time, a memory amount required for the process, and consumption power for the process, there is an advantage that a conversion process more appropriate than that in the second aspect in terms of a processing cost can be performed.

According to a fourth aspect of the invention, there is provided the print control apparatus according to the second aspect, wherein the printer setting distributor selects a distribution method in which a processing cost value included in the processing cost information is the lowest for determining a destination for distribution from among the plurality of printer setting converters.

Under this configuration, since the printer setting distributor selects a distribution method in which a processing cost value included in the processing cost information is the lowest for distribution, display of the processing costs become more specific, and thereby there is an advantage that a conversion process more appropriate than that in the second or third aspect can be performed.

According to a fifth aspect of the invention, there is provided the print control apparatus according to the first aspect, wherein the plurality of printer setting converters respectively has a PJL conversion section for converting the print job definition data into a PJL (Printer Job Language) as a control code and a PDL conversion section for converting the print job definition data into a PDL (Page Description Language) as a page description language.

Under this configuration, since the plurality of printer setting converters respectively has a PJL conversion section for converting the print job definition data into a PJL and a PDL conversion section for converting the print job definition data into a PDL, general description languages can be processed, and thereby there is an advantage that most of the conversion processes can be handled.

According to a sixth aspect of the invention, there is provided the print control apparatus according to the first aspect, further including a transmission unit that transmits the printer setting data converted by the plurality of printer setting converters to a printer.

Under this configuration, since a transmission unit that transmits the printer setting data converted by the plurality of printer setting converters to a printer is included, a transmission operation for the printer can be performed and the print control apparatus can be configured independently.

According to a seventh aspect of the invention, there is provided the print control apparatus according to the first aspect, wherein the printer distributor preferentially distributes the print job definition data to the plurality of printer setting converters when the printer setting data exists in the content data and the printer setting data is a duplicate of the print job definition data or is contradictory to the print job definition data.

Under this configuration, since the printer distributor preferentially distributes the print job definition data to the plurality of printer setting converters when the printer setting data exists in the content data and the printer setting data is a duplicate of the print job definition data or is contradictory to the print job definition data, there is an advantage that a duplicate conversion process or waste can be prevented, the total processing cost can be reduced, and an appropriate conversion process can be performed.

According to an eighth aspect of the invention, there is provided a print control method including: acquiring print job definition data by acquiring print data including print job definition data and content data and interpreting the acquired print data; performing plural types of conversion processes for the print job definition data acquired by the acquiring of the print job definition data into printer setting data for setting a printer; dividing the print job definition data by each item and distributing the divided items for performing the plural types of conversion processes for the print job definition data at a time when the print job definition data is supplied after the acquiring of the print job definition data for the performing the plural types of conversion processes for the print job definition data and receiving the printer setting data converted by performing the plural types of conversion processes for the print job definition data; and acquiring the converted printer setting data and the content data input by the acquiring of the print job definition data by the dividing of the print job definition data and transmitting the printer setting data and the content data to the printer.

Under this configuration, since dividing the print job definition data by each item and distributing the divided items for performing the plural types of conversion process to the plurality of printer setting converters, the performing plural types of conversion processes for the print job definition data can convert items of the print job definition data, for example, settings of double sided printing, short edge binding, long edge binding, a paper size, and imposition, into descriptions that can be interpreted by the printer, and thereby there is an advantage that an appropriate conversion process can be performed.

According to a ninth aspect of the invention, there is provided the print control method according to the eighth aspect, further including storing processing cost information for each item of the print job definition data in the performing plural types of conversion processes for the print job definition data, wherein the dividing of the print job definition data distributes items of the print job definition data for the performing the plural types of conversion processes for the print job definition data with reference to the processing cost information.

Under this configuration, since the dividing of the print job definition data distributes each item of the print job definition data for performing a type of a conversion process for the print job definition data having the lowest processing cost with reference to the processing cost information, there is an advantage that an appropriate conversion process in terms of the processing cost can be performed.

According to a 10th aspect of the invention, there is provided the print control method according to the ninth aspect, wherein one of a time required for processing the printer setting data by using the printer, a time required for a conversion process, a total processing time, a memory amount required for the process, and consumption power for the process is stored as the processing cost information.

Under this configuration, since the dividing of the print job definition data distributes each item of the print job definition data for performing plural types of conversion processes for the print job definition data having the lowest processing cost with reference to one of a time required for processing the printer setting data by using the printer, a time required for a conversion process, a total processing time, a memory amount required for the process, and consumption power for the process, there is an advantage that a conversion process more appropriate than that in the ninth aspect in terms of a processing cost can be performed.

According to an 11th aspect of the invention, there is provided the print control method according to the ninth aspect, wherein the dividing of the print job definition data selects a distribution method in which a processing cost value included in the processing cost information is the lowest for determining a type of a conversion process for the print job definition data for distribution from among the plural types of conversion processes for the print job definition data.

Under this configuration, since the dividing of the print job definition data selects a distribution method in which a processing cost value included in the processing cost information is the lowest for distribution, display of the processing costs become more specific, and thereby there is an advantage that a conversion process more appropriate than that in the 9th or 10th aspect can be performed.

According to a 12th aspect of the invention, there is provided the print control method according to the eighth aspect, wherein the plural types of conversion processes for the print job definition data respectively includes converting the print job definition data into a PJL (Printer Job Language) as a control code and converting the print job definition data into a PDL (Page Description Language) as a page description language.

Under this configuration, since the performing plural types of conversion processes for the print job definition data includes the converting of the print job definition data into a PJL and the converting of the print job definition data into a PDL, general description languages can be processed, and thereby there is an advantage that most of the conversion processes can be handled.

According to a 13th aspect of the invention, there is provided the print control method according to the first aspect, further including transmitting the printer setting data converted by the performing plural types of conversion processes for the print job definition data to a printer.

Under this configuration, since the transmitting of the printer setting data converted by the performing plural types of conversion processes for the print job definition data to a printer is included, a transmission operation for the printer can be performed and the print control apparatus can be configured independently.

According to a 14th aspect of the invention, there is provided the print control method according to the eighth aspect, wherein the dividing of the print job definition data distributes the print job definition data for performing plural types of conversion processes for the print job definition data when the printer setting data exists in the content data and the printer setting data is a duplicate of the print job definition data or is contradictory to the print job definition data.

Under this configuration, since the dividing of the print job definition data preferentially distributes the print job definition data for the performing plural types of converting the print job definition data when the printer setting data exists in the content data and the printer setting data is a duplicate of the print job definition data or is contradictory to the print job definition data, there is an advantage that a duplicate conversion process or waste can be prevented, the total processing cost can be reduced, and an appropriate conversion process can be performed.

According to a 15th aspect of the invention, there is provided a print control program for allowing a computer to perform a process implemented by: input means that acquires print job definition data by acquiring print data including print job definition data and content data and interpreting the acquired print data; a plurality of printer setting converting means that convert the print job definition data acquired by the input means into printer setting data for setting a printer; printer setting distributing means that divides the print job definition data by each item and distributes the divided items to the plurality of printer setting converters at a time when the print job definition data is supplied from the input means to the printer setting converting means and receives the printer setting data that has been converted by the plurality of printer setting converting means; and a transmission means that receives the converted printer setting data and the content data input from the input means through the printer setting distributing means and transmits the printer setting data and the content data to the printer.

Under this configuration, since the printer setting distributing means divides the print job definition data by each item and distributes the divided items to the plurality of printer setting converting means, the plurality of printer setting converting means can convert items of the print job definition data, for example, settings of double sided printing, short edge binding, long edge binding, a paper size, and imposition, into descriptions that can be interpreted by the printer, and thereby there is an advantage that an appropriate conversion process can be performed.

According to a 16th aspect of the invention, there is provided the print control program according to the 15th aspect, further including a processing cost information storage means that stores processing cost information of the plurality of printer setting converting means for each item of the print job definition data, wherein the printer setting distributing means distributes items of the print job definition data to the plurality of printer setting converting means with reference to the processing cost information.

Under this configuration, since the printer setting distributing means distributes each item of the print job definition data to a printer setting converting means having the lowest processing cost with reference to the processing cost information, there is an advantage that an appropriate conversion process in terms of the processing cost can be performed.

According to a 17th aspect of the invention, there is provided the print control program according to the 9th aspect, wherein one of a time required for processing the printer setting data by using the printer, a time required for a conversion process, a total processing time, a memory amount required for the process, and consumption power for the process is stored as the processing cost information.

Under this configuration, since the printer setting distributing means distributes each item of the print job definition data to a printer setting converting means having the lowest processing cost with reference to one of a time required for processing the printer setting data by using the printer, a time required for a conversion process, a total processing time, a memory amount required for the process, and consumption power for the process, there is an advantage that a conversion process more appropriate than that in the 16th aspect in terms of a processing cost can be performed.

According to a 18th aspect of the invention, there is provided the print control program according to the 16th aspect, wherein the printer setting distributing means selects a distribution method in which a processing cost value included in the processing cost information is the lowest for determining a destination for distribution from among the plurality of printer setting converting means.

Under this configuration, since the printer setting distributing means selects a distribution method in which a processing cost value included in the processing cost information is the lowest for distribution, display of the processing costs become more specific, and thereby there is an advantage that a conversion process more appropriate than that in the 16th or 17th aspect can be performed.

According to a 19th aspect of the invention, there is provided the print control program according to the 15th aspect, wherein the plurality of printer setting converting means respectively has PJL conversion means for converting the print job definition data into a PJL (Printer Job Language) as a control code and a PDL conversion means for converting the print job definition data into a PDL (Page Description Language) as a page description language.

Under this configuration, since the plurality of printer setting converting means respectively has a PJL conversion means for converting the print job definition data into a PJL and a PDL conversion means for converting the print job definition data into a PDL, general description languages can be processed, and thereby there is an advantage that most of the conversion processes can be handled.

According to a 20th aspect of the invention, there is provided the print control program according to the 15th aspect, further including transmission means that transmits the printer setting data converted by the plurality of printer setting converting means to a printer.

Under this configuration, since transmission means that transmits the printer setting data converted by the plurality of printer setting converting means to a printer is included, a transmission operation for the printer can be performed and the print control apparatus can be configured independently.

According to a 21st aspect of the invention, there is provided the print control program according to the 15th aspect, wherein the printer distributing means preferentially distributes the print job definition data to the plurality of printer setting converting means when the printer setting data exists in the content data and the printer setting data is a duplicate of the print job definition data or is contradictory to the print job definition data.

Under this configuration, since the printer distributing means preferentially distributes the print job definition data to the plurality of printer setting converting means when the printer setting data exists in the content data and the printer setting data is a duplicate of the print job definition data or is contradictory to the print job definition data, there is an advantage that a duplicate conversion process or waste can be prevented, the total processing cost can be reduced, and an appropriate conversion process can be performed.

According to a 22nd aspect of the invention, there is provided a printer including: an input unit that acquires print job definition data by acquiring print data including print job definition data and content data and interpreting the acquired print data; a plurality of printer setting converters that convert the print job definition data acquired by the input unit into printer setting data for setting a printer; a printer setting distributor that divides the print job definition data by each item and distributes the divided items to the plurality of printer setting converters at a time when the print job definition data is supplied from the input unit to the printer setting converters and receives the printer setting data that has been converted by the plurality of printer setting converters; a transmission unit that receives the converted printer setting data and the content data input from the input unit through the printer setting distributor and transmits the printer setting data and the content data to a print unit; and the print unit that performs a printing operation on the basis of the converted printer setting data and the content data.

Under this configuration, since the printer setting distributor divides the print job definition data by each item and distributes the divided items to the plurality of printer setting converters, the plurality of printer setting converters can convert items of the print job definition data, for example, settings of double sided printing, short edge binding, long edge binding, a paper size, and imposition, into descriptions that can be interpreted by the printer, and thereby there is an advantage that an appropriate conversion process can be performed.

According to a 23rd aspect of the invention, there is provided the printer according to the 22nd aspect, further including a processing cost information storage unit that stores processing cost information of the plurality of printer setting converters for each item of the print job definition data, wherein the printer setting distributor distributes items of the print job definition data to the plurality of printer setting converters with reference to the processing cost information.

Under this configuration, since the printer setting distributor distributes each item of the print job definition data to a printer setting converter having the lowest processing cost with reference to the processing cost information, there is an advantage that an appropriate conversion process in terms of the processing cost can be performed.

According to a 24th aspect of the invention, there is provided the printer according to the 23rd aspect, wherein one of a time required for processing the printer setting data by using the printer, a time required for a conversion process, a total processing time, a memory amount required for the process, and consumption power for the process is stored as the processing cost information.

Under this configuration, since the printer setting distributor distributes each item of the print job definition data to a printer setting converter having the lowest processing cost with reference to one of a time required for processing the printer setting data by using the printer, a time required for a conversion process, a total processing time, a memory amount required for the process, and consumption power for the process, there is an advantage that a conversion process more appropriate than that in the 23rd aspect in terms of a processing cost can be performed.

According to a 25th aspect of the invention, there is provided the printer according to the 23rd aspect, wherein the printer setting distributor selects a distribution method in which a processing cost value included in the processing cost information is the lowest for determining a destination for distribution from among the plurality of printer setting converters.

Under this configuration, since the printer setting distributor selects a distribution method in which a processing cost value included in the processing cost information is the lowest for distribution, display of the processing costs become more specific, and thereby there is an advantage that a conversion process more appropriate than that in the 23rd or 24th aspect can be performed.

According to a 26th aspect of the invention, there is provided the printer according to the 22nd aspect, wherein the plurality of printer setting converters respectively has a PJL conversion section for converting the print job definition data into a PJL (Printer Job Language) as a control code and a PDL conversion section for converting the print job definition data into a PDL (Page Description Language) as a page description language.

Under this configuration, since the plurality of printer setting converters respectively has a PJL conversion section for converting the print job definition data into a PJL and a PDL conversion section for converting the print job definition data into a PDL, general description languages can be processed, and thereby there is an advantage that most of the conversion processes can be handled.

According to a 27th aspect of the invention, there is provided the printer according to the 22nd aspect, further including a transmission unit that transmits the printer setting data converted by the plurality of printer setting converters to a printer.

Under this configuration, since a transmission unit that transmits the printer setting data converted by the plurality of printer setting converters to a printer is included, the print control apparatus can be configured independently.

According to a 28th aspect of the invention, there is provided the printer according to the 22nd aspect, wherein the printer distributor preferentially distributes the print job definition data to the plurality of printer setting converters when the printer setting data exists in the content data and the printer setting data is a duplicate of the print job definition data or is contradictory to the print job definition data.

Under this configuration, since the printer distributor preferentially distributes the print job definition data to the plurality of printer setting converters when the printer setting data exists in the content data and the printer setting data is a duplicate of the print job definition data or is contradictory to the print job definition data, there is an advantage that a duplicate conversion process or waste can be prevented, the total processing cost can be reduced, and an appropriate conversion process can be performed.

According to a 29th aspect of the invention, there is provided a print method including: acquiring print job definition data by acquiring print data including print job definition data and content data and interpreting the acquired print data; performing plural types of converting the print job definition data acquired by the acquiring of the print job definition data into printer setting data for setting a printer; dividing the print job definition data by each item and distributing the divided items for performing the plural types of conversion processes for the print job definition data at a time when the print job definition data is supplied after the acquiring of the print job definition data for the performing the plural types of conversion processes for the print job definition data and receiving the printer setting data converted by performing the plural types of conversion processes for the print job definition data; acquiring the converted printer setting data and the content data input by the acquiring of the print job definition data by the dividing of the print job definition data and transmitting the printer setting data and the content data to the printer; and performing a printing operation on the basis of the converted printer setting data and the content data.

Under this configuration, since dividing the print job definition data by each item and distributing the divided items for performing the plural types of conversion processes to the plurality of printer setting converters, the performing plural types of conversion processes for the print job definition data can convert items of the print job definition data, for example, settings of double sided printing, short edge binding, long edge binding, a paper size, and imposition, into descriptions that can be interpreted by the printer, and thereby there is an advantage that an appropriate conversion process can be performed.

According to a 30th aspect of the invention, there is provided the print method according to the 29th aspect, further including storing processing cost information for each item of the print job definition data in the performing plural types of conversion processes for the print job definition data, wherein the dividing of the print job definition data distributes items of the print job definition data for the performing the plural types of conversion processes for the print job definition data with reference to the processing cost information.

Under this configuration, since the dividing of the print job definition data distributes each item of the print job definition data for performing a type of a conversion process for the print job definition data having the lowest processing cost with reference to the processing cost information, there is an advantage that an appropriate conversion process in terms of the processing cost can be performed.

According to a 31st aspect of the invention, there is provided the print method according to the 30th aspect, wherein one of a time required for processing the printer setting data by using the printer, a time required for a conversion process, a total processing time, a memory amount required for the process, and consumption power for the process is stored as the processing cost information.

Under this configuration, since the dividing of the print job definition data distributes each item of the print job definition data for performing plural types of conversion processes for the print job definition data having the lowest processing cost with reference to one of a time required for processing the printer setting data by using the printer, a time required for a conversion process, a total processing time, a memory amount required for the process, and consumption power for the process, there is an advantage that a conversion process more appropriate than that in the 30th aspect in terms of a processing cost can be performed.

According to an 32nd aspect of the invention, there is provided the print method according to the 30th aspect, wherein the dividing of the print job definition data selects a distribution method in which a processing cost value included in the processing cost information is the lowest for determining a type of a conversion process for the print job definition data for distribution from among the plural types of conversion processes for the print job definition data.

Under this configuration, since the dividing of the print job definition data selects a distribution method in which a processing cost value included in the processing cost information is the lowest for distribution, display of the processing costs become more specific, and thereby there is an advantage that a conversion process more appropriate than that in the 30th or 31st aspect can be performed.

According to a 33rd aspect of the invention, there is provided the print method according to the 29th aspect, wherein the plural types of converting the print job definition data respectively includes converting the print job definition data into a PJL (Printer Job Language) as a control code and converting the print job definition data into a PDL (Page Description Language) as a page description language.

Under this configuration, since the performing plural types of conversion processes for the print job definition data includes the converting of the print job definition data into a PJL and the converting of the print job definition data into a PDL, general description languages can be processed, and thereby there is an advantage that most of the conversion processes can be handled.

According to a 34th aspect of the invention, there is provided the print method according to the 29th aspect, further including transmitting the printer setting data converted by the performing plural types of conversion processes for the print job definition data to a printer.

Under this configuration, since the transmitting of the printer setting data converted by the performing plural types of conversion processes for the print job definition data to a printer is included, a print can be configured independently.

According to a 35th aspect of the invention, there is provided the print method according to the 29th aspect, wherein the dividing of the print job definition data distributes the print job definition data for performing plural types of conversion processes for the print job definition data when the printer setting data exists in the content data and the printer setting data is a duplicate of the print job definition data or is contradictory to the print job definition data.

Under this configuration, since the dividing of the print job definition data preferentially distributes the print job definition data for the performing plural types of converting the print job definition data when the printer setting data exists in the content data and the printer setting data is a duplicate of the print job definition data or is contradictory to the print job definition data, there is an advantage that a duplicate conversion process or waste can be prevented, the total processing cost can be reduced, and an appropriate conversion process can be performed.

According to a 36th aspect of the invention, there is provided a print program for allowing a computer to perform a process implemented by: input means that acquires print job definition data by acquiring print data including print job definition data and content data and interpreting the acquired print data; a plurality of printer setting converting means that convert the print job definition data acquired by the input means into printer setting data for setting a printer; printer setting distributing means that divides the print job definition data by each item and distributes the divided items to the plurality of printer setting converters at a time when the print job definition data is supplied from the input means to the printer setting converting means and receives the printer setting data that has been converted by the plurality of printer setting converting means; a transmission means that receives the converted printer setting data and the content data input from the input means through the printer setting distributing means and transmits the printer setting data and the content data to the printer; and printing means that performs a printing operation on the basis of the converted printer setting data and the content data.

Under this configuration, since the printer setting distributing means divides the print job definition data by each item and distributes the divided items to the plurality of printer setting converting means, the plurality of printer setting converting means can convert items of the print job definition data, for example, settings of double sided printing, short edge binding, long edge binding, a paper size, and imposition, into descriptions that can be interpreted by the printer, and thereby there is an advantage that an appropriate conversion process can be performed.

According to a 37th aspect of the invention, there is provided the print program according to the 36th aspect, further including a processing cost information storage means that stores processing cost information of the plurality of printer setting converting means for each item of the print job definition data, wherein the printer setting distributing means distributes items of the print job definition data to the plurality of printer setting converting means with reference to the processing cost information.

Under this configuration, since the printer setting distributing means distributes each item of the print job definition data to a printer setting converting means having the lowest processing cost with reference to the processing cost information, there is an advantage that an appropriate conversion process in terms of the processing cost can be performed.

According to a 38th aspect of the invention, there is provided the print program according to the 37th aspect, wherein one of a time required for processing the printer setting data by using the printer, a time required for a conversion process, a total processing time, a memory amount required for the process, and consumption power for the process is stored as the processing cost information.

Under this configuration, since the printer setting distributing means distributes each item of the print job definition data to a printer setting converting means having the lowest processing cost with reference to one of a time required for processing the printer setting data by using the printer, a time required for a conversion process, a total processing time, a memory amount required for the process, and consumption power for the process, there is an advantage that a conversion process more appropriate than that in the 37th aspect in terms of a processing cost can be performed.

According to a 39th aspect of the invention, there is provided the print program according to the 37th aspect, wherein the printer setting distributing means selects a distribution method in which a processing cost value included in the processing cost information is the lowest for determining a destination for distribution from among the plurality of printer setting converting means.

Under this configuration, since the printer setting distributing means selects a distribution method in which a processing cost value included in the processing cost information is the lowest for distribution, display of the processing costs become more specific, and thereby there is an advantage that a conversion process more appropriate than that in the 37th or 38th aspect can be performed.

According to a 40th aspect of the invention, there is provided the print program according to the 36th aspect, wherein the plurality of printer setting converting means respectively has PJL conversion means for converting the print job definition data into a PJL (Printer Job Language) as a control code and a PDL conversion means for converting the print job definition data into a PDL (Page Description Language) as a page description language.

Under this configuration, since the plurality of printer setting converting means respectively has a PJL conversion means for converting the print job definition data into a PJL and a PDL conversion means for converting the print job definition data into a PDL, general description languages can be processed, and thereby there is an advantage that most of the conversion processes can be handled.

According to a 41st aspect of the invention, there is provided the print program according to the 36th aspect, further including transmission means that transmits the printer setting data converted by the plurality of printer setting converting means to a printer.

Under this configuration, since transmission means that transmits the printer setting data converted by the plurality of printer setting converting means to a printer is included, the print program can be configured independently.

According to a 42nd aspect of the invention, there is provided the print program according to the 36th aspect, wherein the printer distributing means preferentially distributes the print job definition data to the plurality of printer setting converting means when the printer setting data exists in the content data and the printer setting data is a duplicate of the print job definition data or is contradictory to the print job definition data.

Under this configuration, since the printer distributing means preferentially distributes the print job definition data to the plurality of printer setting converting means when the printer setting data exists in the content data and the printer setting data is a duplicate of the print job definition data or is contradictory to the print job definition data, there is an advantage that a duplicate conversion process or waste can be prevented, the total processing cost can be reduced, and an appropriate conversion process can be performed.

According to a 43rd aspect of the invention, there is provided a recording medium having the print control program according to the 15th or 36th aspect recorded thereon.

Under this configuration, since the printer setting distributing means divides the print job definition data by each item and distributes the divided items to the plurality of printer setting converting means, the plurality of printer setting converting means can convert items of the print job definition data, for example, settings of double sided printing, short edge binding, long edge binding, a paper size, and imposition, into descriptions that can be interpreted by the printer, and thereby there is an advantage that an appropriate conversion process can be performed.

BRIEF DESCRIPTION OF THE DRAWINGS

The invention will be described with reference to the accompanying drawings, wherein like numbers reference like elements.

FIG. 7 is a diagram showing an example of a processing cost table according to an embodiment of the invention.

FIG. 8 is a diagram for selecting a processing cost item according to an embodiment of the invention.

FIG. 9 is a diagram showing an example of a processing cost table according to an embodiment of the invention.

FIG. 10 is a diagram showing whether device settings can be combined.

DESCRIPTION OF EXEMPLARY EMBODIMENTS

Hereinafter, print control apparatuses according to embodiments of the present invention will be described in detail with reference to the accompanying drawings.

First Embodiment

First, a first embodiment of the present invention will be described with reference to FIGS. 1 to 5.

Figure 1:
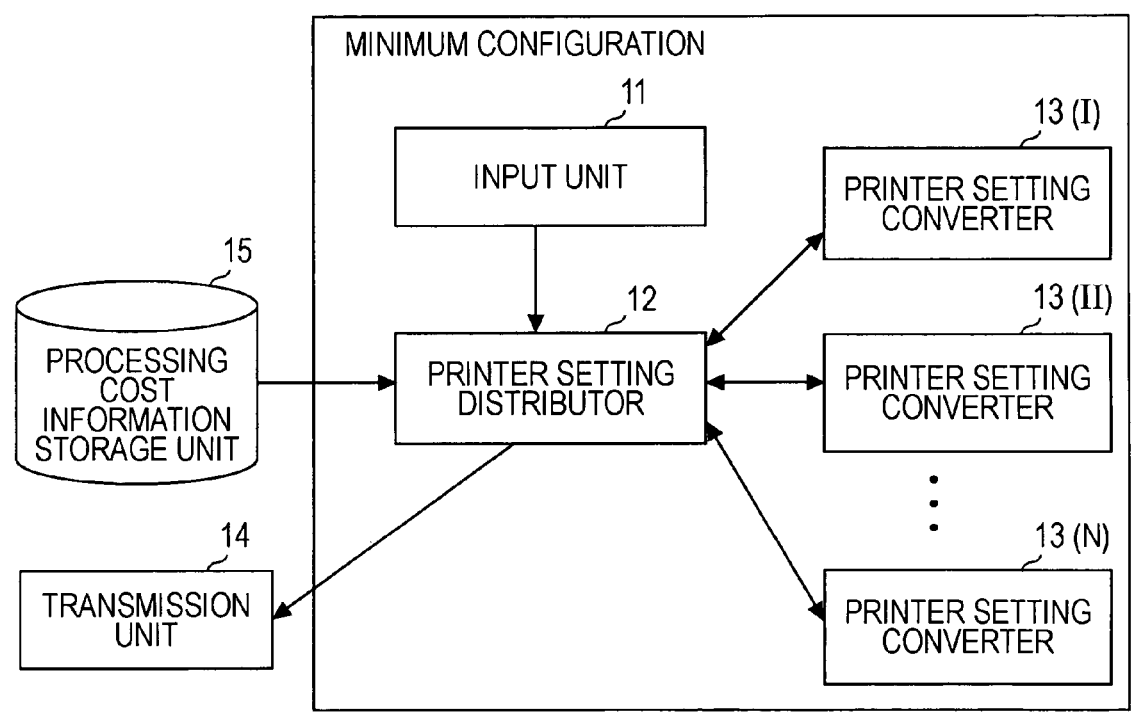
FIG. 1 is a block diagram showing the configuration of a print control apparatus according to a first embodiment of the present invention.

FIG. 1 is a block diagram showing the configuration of a print control apparatus according to the first embodiment.

This print control apparatus 1 includes an input unit 11, a printer setting distributor 12, a plurality of printer setting converters 13(I), 13(II), . . . , 13(N), a transmission unit 14, and a processing cost information storage unit 15.

The input unit 11 acquires print data including print job definition data and content data and interprets the print data, thereby acquiring the print job definition data.

The printer setting distributor 12 divides the print job definition data by each item which has been transmitted from the input unit 11, distributes the divided items to the plurality of printer setting converters 13(I) to 13(N), and receives print setting data that has been converted by the plurality of printer setting converters 13(I) to 13(N).

The printer setting converters 13(I) to 13(N) convert the distributed print job definition data into descriptions, which are interpretable by each print setting means, to be print setting data. The interpretable descriptions, for example, correspond to conversion into a control code or a PDL, and there is a plurality of interpretable descriptions.

The transmission unit 14 transmits the printer setting data converted by the printer setting converters 13(I) to 13(N) to a printer or the like.

In the processing cost storage unit 15, processing cost information used for determining a printer setting converter, to which the print job definition data is to be distributed, from among the printer setting converters 13(I) to 13(N) is stored. However, this processing cost information storage unit 15 is optional. The processing cost information may be stored in the processing cost information storage unit or another memory unit. Furthermore, the processing cost information may be configured to be transmitted from the outside of the print control apparatus.

Figure 2:
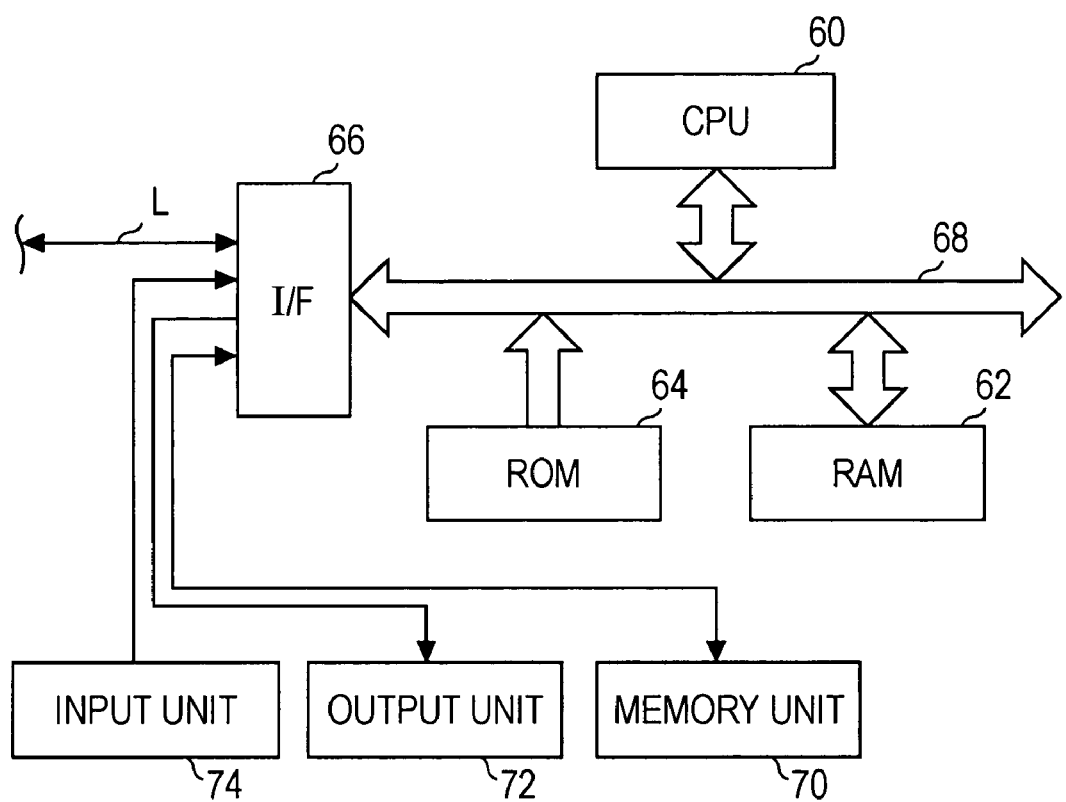
FIG. 2 is a functional block diagram showing the hardware configuration of a computer system according to an embodiment of the invention.

FIG. 2 is a functional block diagram showing the hardware configuration of a computer system.

Here, the print control apparatus 1 has a computer system for implementing the input unit 11, the printer setting distributor 12, the printer setting converters 13(I) to 13(N), the transmission unit 14, and the like as software. The print control apparatus 1, as shown in FIG. 2, has a hardware configuration in which a CPU (Central Processing Unit) 60 responsible for various control and calculation processes, a RAM (Random Access Memory) 62 constituting a main memory device (Main Storage), and a ROM (Read Only Memory) 64 used as a read-only memory device are connected together through various internal or external buses 68 including a PCI (Peripheral Component Interconnect) bus, an ISA (Industrial Standard Architecture) bus, or the like and an external storage device (Secondary Storage) 70 such as a HDD (Hard Disk Drive), an output device 72 such as printing means, a CRT, or an LCD monitor, an input device 74 such as an operation panel, a mouse, a keyboard, or a scanner, and a network L used for communicating with a print direction device, not shown in the figure, and the like are connected to the bus 68 through an input/output interface (I/F) 66.

When the power is turned on, a system program such as a BIOS which is stored in the ROM 64 or the like loads various special-purpose computer programs stored in the ROM 64 in advance or various special-purpose computer programs installed in the memory device 70 through a recording medium such as a CD-ROM, a DVD-ROM, or a flexible disk (FD) or through a communication network L such as the Internet in the RAM 62 in the same manner. Then, the CPU 60 uses various resources in accordance with commands described in the program loaded into the RAM 62 so as to perform predetermined control and calculation processes, and thereby the functions of the above-described means can be implemented as software.

Next, a print control method according to the first embodiment of the invention will be described with reference to FIGS. 3 to 5.

Figure 3:
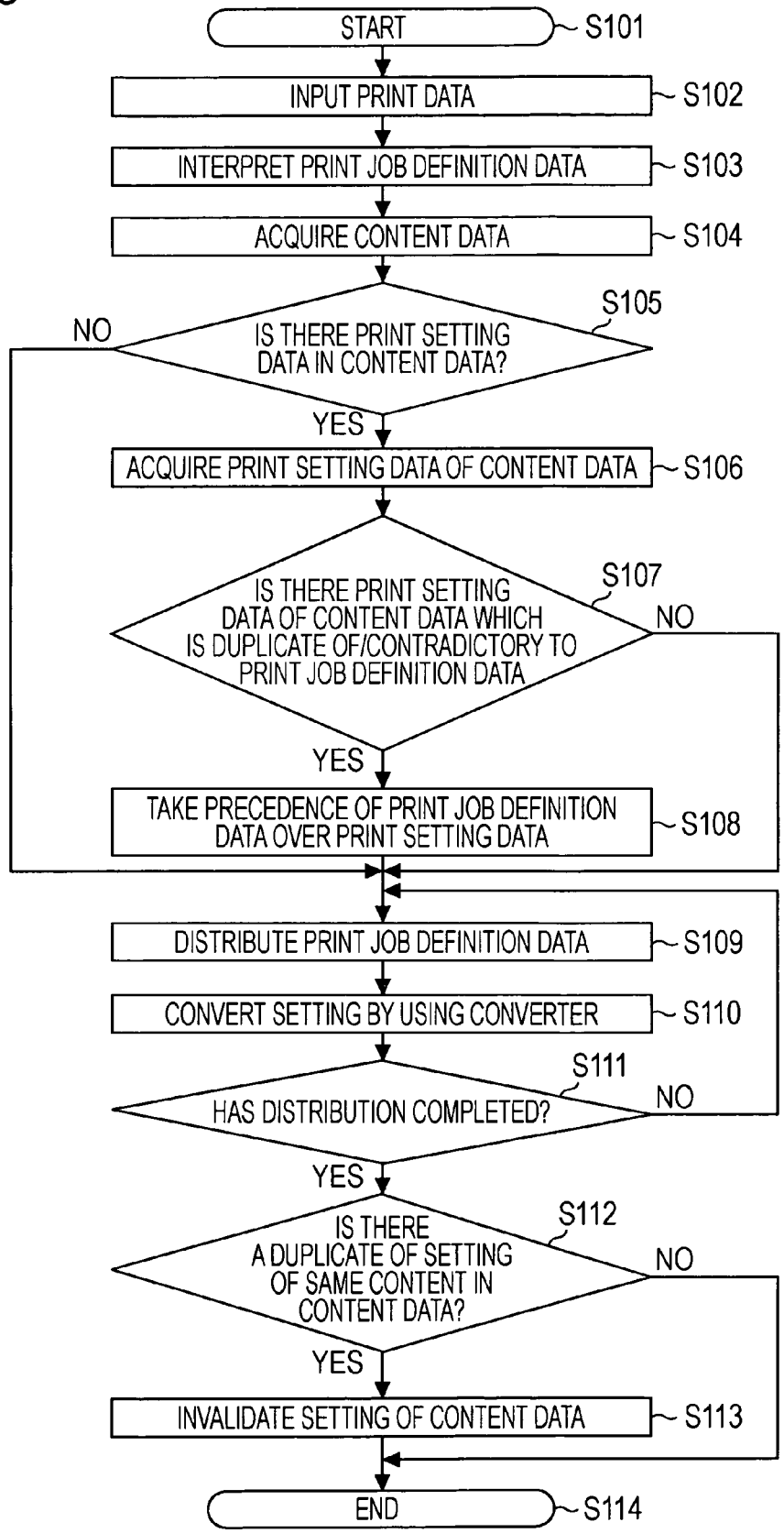
FIG. 3 is a flowchart showing the flow of a print control method according to a first embodiment of the invention.

FIG. 3 is a flowchart showing the flow of the print control method according to the first embodiment of the invention. FIG. 4 is a distribution table showing a distribution method of the printer setting process. FIG. 5 is a diagram showing an imposition method.

First, after the process is started in Step S101, print data is input by the input unit 11 in Step S102. It is assumed that the following print job definition data is included in the print data, as an example.

As <Job Ticket>, <finishing size> A4, <print paper size> A3 horizontal, <print data> HYPERLINK "file:///c;foo.ps" file:///c;foo.ps, <binding> center binding, <binding direction> left, <imposition> 21, <double-sided printing> double-sided short edge binding, </Job Ticket>

Next, in Step S103, the above-described print job definition data is interpreted, and, for example, the following items required for setting a printer are acquired.

(a) print paper size A3 horizontal
(b) imposition of A4 data on two pages horizontally
(c) double-sided printing
(d) short edge binding Next, in Step S104, data designated as the print job definition data is acquired as content data. In this example, it is assumed that the content data is described in a page description language (PDL: PostScript, representatively).

There is a case where print setting data may be included in the content data described in the above-described PDL or the like, and thus, it is determined whether the print setting data exists in the content data in Step S105.

When it is determined that the print setting data exists as a result of the determination, in Step S106, the content data is interpreted and the print setting data included in the content data is acquired. In this embodiment, it is assumed that the following print setting data exists in the "foo.ps" included in a portion of the "<print data>" of the print job definition data (Job Ticket).

<<PageSize[595 842]>>setpagedevice
<</Duplex true/Tumble false>>setpagedevice

Thereafter, in Step S107, it is determined that print setting data which is a duplicate of or contradictory to the print job definition data exists.

When the print setting data which is a duplicate of or contradictory to the print job definition data exists as a result of the determination, the content designated in the print job definition data is configured to be preferential in Step S108. In this example, the first line represents setting of the paper size as "A4", and the second line represents setting of "double-sided long edge binding". However, this setting is contradictory to the content designated in the print job definition data, and accordingly, the content designated as the print job definition data is preferential. In addition, when there is information or the like that is not designated in the print job definition data, the information or the like may be merged.

On the other hand, when it is determined that the print setting data does not exist in the content data in Step S105, when the print setting data of the content data which is a duplicate of or contradictory to the print job definition data is determined not to exist in Step S107, or when the print job definition data is preferentially treated in Step S108, in Step S109, the print job definition data is divided for each item thereof by the printer setting distributor 12 and the divided print job definition data is distributed to the plurality of printer setting converters 13(I) to 13(N) in accordance with the print setting means.

Figures 4, 5:
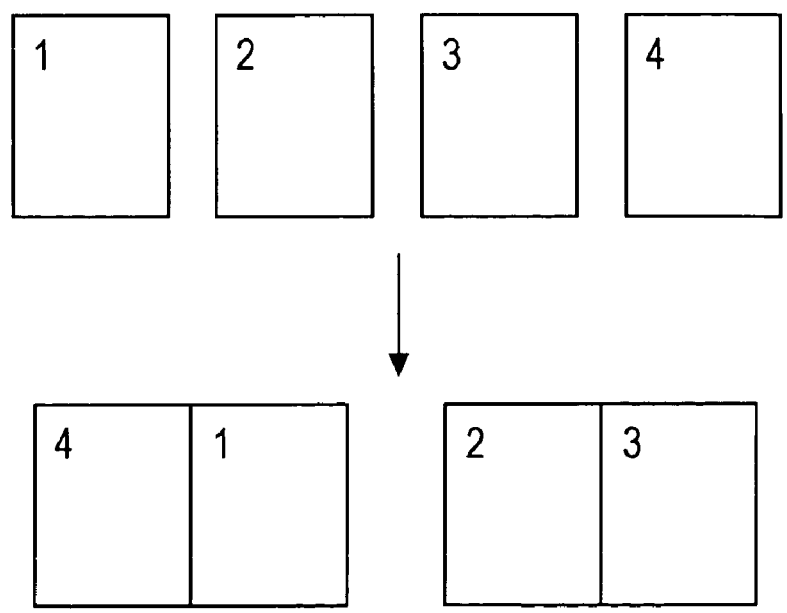
FIG. 4 is a diagram showing an example of a processes distribution table according to an embodiment of the invention.
FIG. 5 is a diagram showing an example of an imposition method according to an embodiment of the invention.

In addition, when the print job definition data is distributed in Step S109, a distribution table representing a method of distributing the print setting process as shown in FIG. 4 is maintained, and the setting items of the print job definition data are distributed to the corresponding printer setting converters 13(I)~13(N) according to a plurality of the print setting means for the printer setting data (in this example, print setting means for conversion into PJL (control code) and print setting means for conversion into PDL) on the basis of the distribution table. In the distribution of this example, double-sided printing, short edge binding, or long edge binding is configured to be distributed for being set by using the PJL, and the paper size or imposition is configured to be distributed for being set by using the PDL. In addition, the conversion into the PDL is configured to be performed on the basis of a corresponding description in the content data.

Next, in Step S110, the distributed print job definition data is converted into printer setting data by the printer setting converters 13(I) to 13(N). In each printer setting converter 13(I) to 13(N), the distributed print job definition data is converted into corresponding print setting means such as the PJL (control code) description, the PDL description, or the like and is returned. For example, for the PJL (control code), setting of double-sided printing and short edge binding is distributed, and the following contents are returned.

PJL SET DUPLEX=ON
PJL SET BINDING=SHORTEDGE

In the contents, the first line represents double-sided printing, and the second line represents short edge binding.

In addition, for setting by using the PDL, the paper size or the imposition is distributed. A corresponding portion of the content data is converted as follows, so that the paper size is set to "A3" from "A4".

Page Size[1190 842]>>setpagedevice

In an imposition process, each page is rearranged. The example of an imposition process shown in FIG. 5 is for imposing four pages shown on the upper side, and content data before a conversion process is shown on the upper side, and the content data after the conversion is shown on the lower side. In other words, before the conversion process, pages 1, 2, 3, and 4 shown on the upper side are arranged from the left, and after the conversion process, pages 4 and 1 are arranged on the first page (on the left side in the figure) and pages 2 and 3 are arranged on the second page (on the right side in the figure).

Next, in Step S111, it is determined whether all the distribution processes are completed. When all the distribution processes are not completed, the process proceeds back to Step S109 for distribution and the conversion process of Step S110 is performed, and these processes are repeated until all the distribution processes are completed.

On the other hand, when it is determined that all the distribution processes are completed in Step S111, it is determined whether a setting of a same content which is a duplicate of or contradictory to the print job definition data exists in the content data in Step S112.

Then, when it is determined that there is a duplicate or contradictory content in Step S112, the setting of the content data is invalidated in Step S113. For example, when there is a setting of double-sided biding in the content data, the setting is contradictory to the content set by using the PJL (short edge binding), and accordingly, the setting is invalidated. As a method of invalidation, for example, a method of deleting a corresponding line or commenting out (for example, inserting "%" in the head of a line) is generally used, although the used method varies for the cases.

On the other hand, when it is determined that there is no duplicate or contradictory content in the content data in Step S112 or when the invalidation process of the content data is completed in Step S113, all the operations are completed in Step S114.

In the above-described process, the printer setting distributor 12 divides the print job definition data by each item and the divided items are distributed to the plurality of printer setting converters 13(I) to 13(N). Accordingly, the plurality of printer setting converters 13(I)~13(N) can convert items of the print job definition data, for example, settings of double-sided printing, short edge binding, long edge binding, a paper size, and imposition into descriptions interpretable by the printer, and thereby it is possible to perform an appropriate conversion process.

Second Embodiment

Next, a second embodiment of the present invention will be described with reference to FIGS. 6 to 10.

Figure 6:
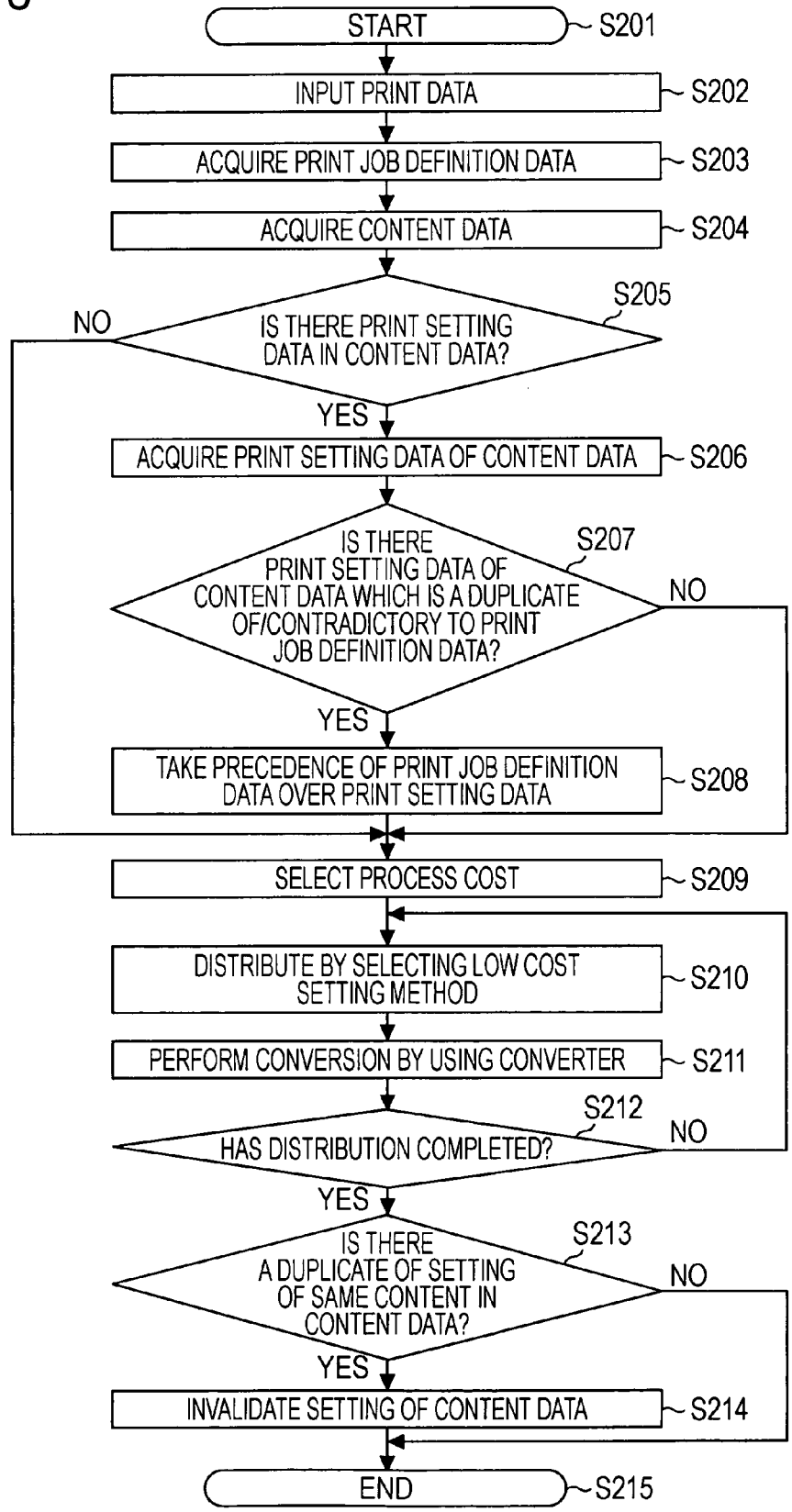
FIG. 6 is a flowchart showing the flow of a print control method according to a second embodiment of the invention.
Figure 11:
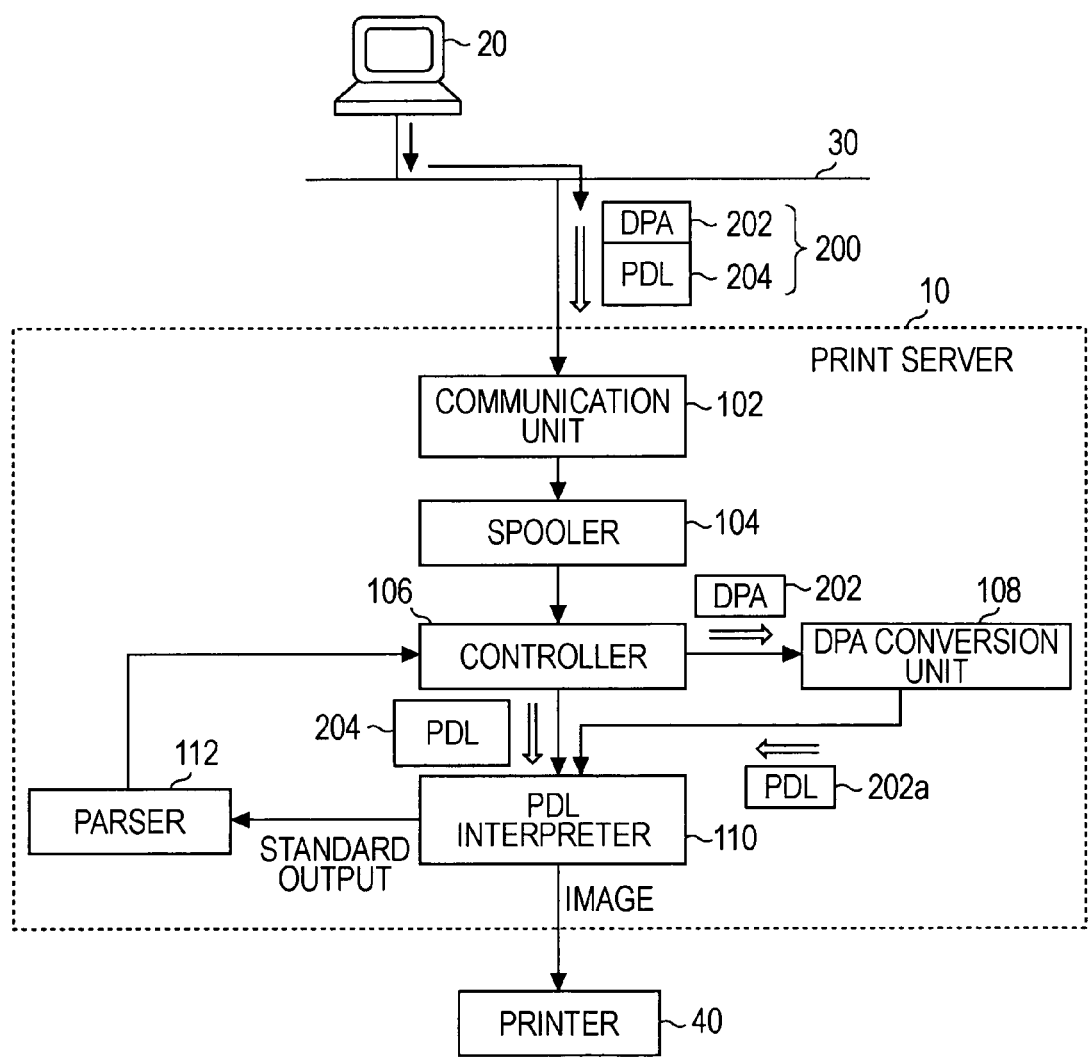
FIG. 11 is a block diagram showing the configuration of an invention described in JP-A-10-124272.

FIG. 6 is a flowchart showing the flow of a print control method according to the second embodiment of the invention. FIG. 7 is a processing cost table for each printer setting converter. FIG. 8 is a diagram for selecting a processing cost item. FIG. 9 is a diagram showing the processing cost table for each printer setting converter. FIG. 10 is a diagram showing whether device settings can be combined.

Since Steps S201 to S208 are the same as Steps S101 to S108 in the first embodiment, descriptions thereof are omitted here.

When it is determined that the print setting data does not exist in the content data in Step S205, when the print setting data of the content data which is a duplicate of or contradictory to the print job definition data is determined not to exist in Step S207, or when the print job definition data is preferentially treated in Step S208, in Step S209, a setting method in which the process cost is the lowest is selected for distribution of the print job definition data.

In other words, in Step S209, when a setting method in which the processing cost is the lowest is to be selected, a processing cost table for each printer setting converter as shown in FIG. 7 is used. According to this embodiment, the print job definition data to be converted by each printer setting converter (PJL (control code), PDL, or the like) is distributed on the basis of this processing cost table. In this example, a printer setting converter I corresponds to PJL (control code), and a printer setting converter II corresponds to PDL. In addition, when there are other printer setting means, the printer setting means are similarly configured to be the printer setting converter III and thereafter. In this example, the processing cost is determined on the basis of a time required for processing the corresponding printer setting by using the printer. As the number of the processing cost increases, the corresponding processing cost is represented to be high. In other words, number "1" represents a low processing cost, number "10" represents a high processing cost, and number "20" represents a much high processing cost. In addition, an item that cannot be set by the corresponding printer setting means is represented by "−1".

In the processing cost table for each printer setting converter shown in FIG. 7, processing costs for items such as double-sided printing, short edge binding, long edge binding, paper size setting, imposition, and the like for the printer setting converter I and the printer setting converter II are represented. According to the processing cost table, for the double-sided printing, the short edge binding, the long edge binding, and the paper size setting, the printer setting converter I has a lower processing cost than the printer setting converter II, and therefore the distribution process is performed by selecting the PJL (control code) of the printer setting converter I.

The processing cost table is not limited to a table on the basis of a time, and may be created on the basis of other factors such as the memory amount required for the process or consumption power for the process.

Next, in Step S210, a printer setting converter in which the processing cost is the lowest is selected, and all the items are distributed to the printer setting converters 13(I) to 13(N).

In this distribution process, a dialogue for selecting a processing cost item as shown in FIG. 8 is displayed to a user. As the dialogue for selecting a processing cost item, in an upper most part of the figure, an instruction of "Please select" is displayed, and one among four items is configured to be selected by the user. As this four selection items, for example, "conversion processing time", "printer processing time", "total processing time, and "required memory" are displayed as the processing cost items, as shown in the figure.

In addition, as the processing cost table, a processing cost table as shown in FIG. 9 is prepared. In the processing cost table, as shown in the figure, cost values corresponding to the processing time and memory which are displayed in the dialogue for selecting a processing cost item shown in FIG. 8 are stored. In the figure, as an example, processing costs for the items of "conversion processing time", "processing time on the printer side", and "memory required on the printer side" are displayed for each device. In addition, as setting items, "double-sided printing setting", "short-side binding", "long-side binding", "paper size setting", "imposition", and "margin setting" are displayed. The "conversion processing time" represents a cost on the basis of a time required for a conversion process of the system into the print device setting data. The "processing time on the printer side" represents a cost on the basis of a time required for receiving the printer setting data and setting the device on the printer side. The "total processing time" represents a cost on the basis of a sum of the conversion process time and the processing time on the print side. The "required memory on the printer side" represents a cost on the basis of the amount of memory required for setting the device by processing the printer setting data on the printer side.

The processing cost table shown in FIG. 9 shows processing costs as a table in cases where a user selects the "conversion processing time", "printer processing time", and the "required memory" shown in FIG. 8. The cost is calculated by using the cost table with reference to a cost selected by the user. In this table, operations for calculating the processing costs on the basis of "conversion processing time", "printer processing time", and the "required memory" are respectively performed for the devices 1, 2, and 3. First, the costs on the basis of "conversion processing time" are calculated as "1, 2, and 2" for "double sided printing setting" in the order of devices 1, 2 and 3, "1, 2, and 2" for "short edge binding" in the order thereof, as "1, 2, and 2", for "long edge binding" in the order thereof, as "1, 2, and 2" for "paper size setting" in the order thereof, as "−1, 14, and 12" for "imposition" in the order thereof, and as "−1, 3, and 4" for "margin setting" in the order thereof. In addition, the costs on the basis of "processing time on the printer side" are calculated as "3, 5, and 4" for "double sided printing setting" in the order of devices 1, 2 and 3, "3, 4, and 4" for "short edge binding" in the order thereof, as "3, 4, and 4" for "long edge binding" in the order thereof, as "3, 4, and 4" for "paper size setting" in the order thereof, as "−1, 11, and 12" for "imposition" in the order thereof, and as "−1, 8, and 10" for "margin setting" in the order thereof. In addition, the costs on the basis of "memory required on the printer side" are calculated as "1, 9, and 6" for "double sided printing setting" in the order of devices 1, 2 and 3, "1, 5, and 8" for "short edge binding" in the order thereof, as "1, 5, and 6" for "long edge binding" in the order thereof, as "1, 5, and 6" for "paper size setting" in the order thereof, as "−1, 15, and 20" for "imposition" in the order thereof, and as "−1, 9, and 2" for "margin setting" in the order thereof. In addition, a case where the cost is represented as "−1" indicates that the setting cannot be made.

Next, in the above-described example, the change in the combination of printer settings will be described by referring to a plurality of cases where the costs selected by the user are different from one another.

The common content of the print job definition data is as follows.

double-sided printing, short edge binding
paper size A4
imposition 2 impositions
no margin setting First, when the user selects the conversion processing time in the dialogue for selecting a processing cost item, columns of processing time of the conversion processing time in the processing cost table shown in FIG. 9 are referred, a printer setting converter (hereinafter, referred to as device setting) having the lowest cost is selected, and the following assignments to each converter are made.

double sided printing->device setting I (device setting I->1, device setting II->2, device setting III->2)
short edge binding->device setting I (device setting I->1, device setting II->2, device setting III->2)
paper size->device setting I (device setting I->1, device setting II->2, device setting III->2)
imposition->device setting III (device setting I->"Not Available", device setting II->14, device setting III->12)
margin setting->device setting II (device setting I->"Not Available", device setting II->3, device setting III->4)

In addition, when the user selects the processing time on the printer side in the dialogue for selecting a processing cost item, columns of processing time on the printer side in the processing cost table shown in FIG. 9 are referred, a printer setting converter (hereinafter, referred to as device setting) having the lowest cost is selected, and the following assignments to each converter are made.

double sided printing->device setting I (device setting I->3, device setting II->5, device setting III->4)
short edge binding->device setting I (device setting I->3, device setting II->4, device setting III->4)
paper size->device setting I (device setting I->3, device setting II->4, device setting III->4)
imposition->device setting II (device setting I->"Not Available", device setting II->11, device setting III->12)
margin setting->device setting II (device setting I->"Not Available", device setting II->8, device setting III->10)

In addition, when the user selects the memory required on the printer side in the dialogue for selecting a processing cost item, columns of memory required on the printer side in the processing cost table shown in FIG. 9 are referred, a printer setting converter (hereinafter, referred to as device setting) having the lowest cost is selected, and the following assignments to each converter are made.

double sided printing->device setting I (device setting I->1, device setting II->9, device setting III->6)
short edge binding->device setting I (device setting I->1, device setting II->5, device setting III->8)
paper size->device setting I (device setting I->1, device setting II->5, device setting III->6)

imposition->device setting II (device setting I->"Not Available", device setting II->15, device setting III->20)
margin setting->device setting III (device setting I->"Not Available", device setting II->9, device setting III->2)

In addition, when the user selects the total processing time in the dialogue for selecting a processing cost item, a sum of both the cost for the conversion processing time and the cost for the processing time on the printer side is used as the cost, and the following assignments to each converter are made.
double sided printing->device setting I (device setting I->(1+ 3), device setting II->(2+5), device setting III->(2+4))
short edge binding->device setting I (device setting I->(1+3), device setting II->(2+4), device setting III->(2+4))
paper size->device setting I (device setting I->(1+3), device setting II->(2+4), device setting III->(2+4))
imposition->device setting III (device setting I->"Not Available", device setting II->(14+11), device setting III->12+12)

In addition, in the above-described embodiment, when there is a plurality of print settings of different types or print settings having a mutually exclusive relationship exist, or the like, an indication of a case where the device settings II and III have a mutually exclusive relationship is added. For example, when there are device settings that cannot be simultaneously used as in a case where the device settings I and II are different types of PDL and the device setting I is Postscript and the device setting II is ESC/Page, it is convenient if a combination table as shown in FIG. 10 is maintained.

In FIG. 10, for the device setting I, "O" marks are represented in both of the device settings II and III. This indicates that the device setting I can be combined with the device setting II or the device setting III. On the other hand, for the device setting II, an "X" mark is represented in the device setting III. This indicates that the device setting II cannot be combined with the device setting III. As a result, according to this table, while the device settings I and II and the device settings I and III can be combined together, the device settings II and III cannot be combined. Likewise, all the device settings I, II, and III cannot be combined together.

Here, since the device settings II and II cannot be used simultaneously, the costs are summed together and a combination having the lowest summed cost is selected.

As an example, a case where the content of the print job definition data is as follows will be described.
double sided printing;
short edge binding;
paper size A4;
imposition 2 impositions; and
margin 15 mm When the user selects the conversion processing time in the dialogue for selecting a processing cost item, the following device settings are made according to the above-described modified example.
double sided printing->device setting I;
short edge binding->device setting II;
paper size A4->device setting I;
imposition->device setting III; and
margin->device setting II However, since the device settings II and II cannot be simultaneously used, this combination cannot be used. In this case, the following combination is considered.
double sided printing->device setting I (cost: 1);
short edge binding->device setting I (cost: 1);
paper size A4->device setting I (cost: 1);
imposition->device setting III (cost: 12); and
margin->device setting III (cost: 4)

In other words, for the margin, the device setting III is used instead of the device setting II. By using this combination, the total processing cost becomes a minimum of "19". Accordingly, this combination can be used.

As described above, after the conversion processes are performed by the printer setting converters 13(I) to 13(N), the converted PJL (control code) or PDL description corresponding to the print job definition data is returned to the print setting device distributor 12. For example, when the above-described settings of double sided printing, short edge binding, and a paper size is transmitted to the printer setting converters 13(I) to 13(N) that perform operations for converting into PJL (control code), the following settings are returned.
PJL SET DUPLEX=ON;
PJL SET BINDING=SHORTEDGE; and
PJL SET PAPER=A3

The first line designates double sided printing, the second line designates a short edge binding, and the third line designates a paper size of A3.

On the other hand, to the printer setting converter that performs conversion into PDL, an imposition is transmitted. Since this imposition is the same as that of the first embodiment described above with reference to FIG. 5, a description thereof is omitted here.

When all the above-described conversion processes are completed, it is determined whether a setting of a same content included in the content data (described in PDL) exists in Step S213, and the setting of the content data is invalidated in Step S214. In this example, portions for setting the paper size and the double sided long edge binding are invalidated.

Then, in Step S215, all the operations are completed.

As described above, when there is a plurality of device settings, the print job definition data is distributed to the printer setting converters 13(I) to 13(N) corresponding to the device settings, and thereby an optimal combination can be set.

In the above-described embodiments, for performing the processes shown in the flowchart shown in FIGS. 3 and 6, although a case where a control program stored in the ROM 52 in advance is executed has been described, the present invention is not limited thereto. Thus, the program may be loaded into the RAM 53 from a memory medium, on which a program representing the sequence is stored, and executed. Alternatively, the program may be acquired from a network.

Here, the memory medium may be a semiconductor memory medium such as a RAM or a ROM, a magnetic memory-type storage medium such as an FD or an HD, an optical readout type storage medium such as a CD, a CDV, an LD, or a DVD, or a magnetic memory/optical readout type storage medium such as an MO. The recording medium includes any type of a recording medium as long as the recording medium can be read out by a computer regardless of a read-out method thereof such as an electronic method, a magnetic method, or an optical method.

As above, while the embodiments of the present invention has been described, the present invention is not limited thereto and various changes or modifications can be made therein without departing from the gist of the invention.

For example, in this embodiment, although the print control apparatus 1 has an independent configuration, the present invention is not limited thereto, and the print control unit may have a configuration so as to be installed to the printer and formed integrally with the printer.

In addition, in this embodiment, in the processing cost table shown in FIG. 9, although the conversion processing time, the processing time on the printer side, the required memory on the printer side are used, however, the present invention is not limited thereto, and other various factors may be added to processing cost factors.

In addition, in this embodiment, when the user selects the total processing time in the dialogue for selecting a processing cost item, the sum of the conversion processing time and the processing time on the printer side in the processing cost table shown in FIG. 9 is used as the cost, however, the present invention is not limited thereto. Accordingly, the sum of the conversion processing time and the required amount of memory on the printer side may be used, or a total of all the processing cost items may be used.

In addition, in this embodiment, when the print job definition data is distributed by the printer setting distributor 12 to the printer setting converters 13(I) to 13(N), although the processing cost information stored in the processing cost information storage unit 15 is referred, however, the present invention is not limited thereto. Accordingly, the printer setting distributor 12 may include the processing cost information, or a configuration, in which the processing cost information is acquired from the network or the like as is needed, may be used.

In addition, in this embodiment, the data transmission/reception among the input unit 11, the printer setting distributor 12, and the printer setting converters 13(I) to 13(N) may be performed through a network or an external memory medium such as a CD-ROM, a DVD-RAM, or a USB memory.

What is claimed is:

1. A print control apparatus comprising:
an input unit, implemented on a processor, that acquires print job definition data by acquiring print data including print job definition data and content data and interpreting the acquired print data;
a plurality of printer setting converters, implemented on the processor, that convert the print job definition data into printer setting data for setting a printer;
a printer setting distributor, implemented on the processor that divides the print job definition data and distributes the print job definition data to the plurality of printer setting converters, and receives the printer setting data that has been converted by the plurality of printer setting converters;
a transmission unit that receives the converted printer setting data and the content data through the printer setting distributor and transmits the printer setting data and the content data to the printer; and a processing cost information storage unit that stores processing cost information of the plurality of printer setting converters for each item of the print job definition data,
wherein the print job definition data is distributed to the plurality of printer setting converters according to a distribution table indicating whether the print job definition data is to be converted into a PJL (Printer Job Language) as a control code or to be converted into a PDL (Page Description Language) as a page description language;
the printer setting data includes the PJL and the PDL; and
the printer setting distributor distributes items of the print job definition data to the plurality of printer setting converters with reference to the processing cost information.

2. The print control apparatus according to claim 1, wherein one of a time required for processing the printer setting data by using the printer, a time required for a conversion process, a total processing time, a memory amount required for the process, and consumption power for the process is stored as the processing cost information.

3. The print control apparatus according to claim 1, wherein the printer setting distributor selects a distribution method in which a processing cost value included in the processing cost information is lowest for determining a destination for distribution from among the plurality of printer setting converters.

4. The print control apparatus according to claim 1, wherein the printer distributor preferentially distributes the print job definition data to the plurality of printer setting converters when the printer setting data exists in the content data and the printer setting data is a duplicate of the print job definition data or is contradictory to the print job definition data.

5. The print control apparatus according to claim 1, wherein the plurality of printer setting converters respectively has a PJL conversion section for converting the print job definition data into a PJL (Printer Job Language) as a control code and a PDL conversion section for converting the print job definition data into a PDL (Page Description Language) as a page description language.

6. The print control apparatus according to claim 1, wherein each of the plurality of printer setting converters comprises a PJL conversion section for converting the print job definition data into a PJL (Printer Job Language) as a control code and a PDL conversion section for converting the print job definition data into a PDL (Page Description Language) as a page description language.

7. The print control apparatus according to claim 1, wherein the distribution table indicates that at least one of double-sided printing, short edge binding, and long edge binding is to be converted into the PJL as the control code, and indicates that at least one of paper size and imposition is to be converted into the PDL as the page description language.

8. A print control method comprising:
acquiring print job definition data by acquiring print data including print job definition data and content data and interpreting the acquired print data;
performing plural types of conversion processes that converts the print job definition data into printer setting data for setting a printer;
dividing the print job definition data and distributing the print job definition data for performing the plural types of conversion processes for the print job definition data at a time when the print job definition data is supplied after the acquiring of the print job definition data for the performing the plural types of conversion processes for the print job definition data and receiving the printer setting data;
acquiring the printer setting data and the content data by the dividing of the print job definition data and transmitting the printer setting data and the content data to the printer; and
storing processing cost information of the plurality of printer setting converters for each item of the print job definition data,
wherein the print job definition data is distributed according to a distribution table indicating whether the print job definition data is to be converted into a PJL (Printer Job Language) as a control code or to be converted into a PDL (Page Description Language) as a page description language;
the printer setting data includes the PJL and the PDL; and
the items of the print job definition data are distributed to the plurality of printer setting converters with reference to the processing cost information.

9. The print control method according to claim 8, wherein each of the plural types of conversion processes comprises a PJL conversion process for converting the print job definition data into a PJL (Printer Job Language) as a control code and a PDL conversion process for converting the print job definition data into a PDL (Page Description Language) as a page description language.

10. A non-transitory recording medium having a print control program for allowing a computer to perform a process implemented by:
  input means that acquires print job definition data by acquiring print data including print job definition data and content data and interpreting the acquired print data;
  a plurality of printer setting converting means that convert the print job definition data acquired by the input means into printer setting data for setting a printer;
  printer setting distributing means that divides the print job definition data and distributes the print job definition data to the plurality of printer setting converters at a time when the print job definition data is supplied from the input means to the printer setting converting means and receives the printer setting data that has been converted by the plurality of printer setting converting means;
  a transmission means that receives the converted printer setting data and the content data through the printer setting distributing means and transmits the printer setting data and the content data to the printer; and processing cost information storage means that stores processing cost information of the plurality of printer converters for each item of the print job definition data,
  wherein the print job definition data is distributed to the plurality of printer setting converters according to a distribution table indicating whether the print job definition data is to be converted into a PJL (Printer Job Language) as a control code or to be converted into a PDL (Page Description Language) as a page description language;
  the printer setting data includes the PJL and the PDL; and
  the printer setting distributing means distributes items of the print job definition data to the plurality of printer setting converting means with reference to the processing cost information.

11. The recording medium according to claim 10, wherein each of the plurality of printer setting converting means comprises a PJL conversion means for converting the print job definition data into a PJL (Printer Job Language) as a control code and a PDL conversion means for converting the print job definition data into a PDL (Page Description Language) as a page description language.

* * * * *